United States Patent [19]

Ikehara

[11] Patent Number: 5,317,675
[45] Date of Patent: May 31, 1994

[54] NEURAL NETWORK PATTERN RECOGNITION LEARNING METHOD

[75] Inventor: Tadashi Ikehara, Yokohama, Japan

[73] Assignee: Kabushiki Kaisha Toshiba, Kawasaki, Japan

[21] Appl. No.: 722,295

[22] Filed: Jun. 27, 1991

[30] Foreign Application Priority Data

Jun. 28, 1990 [JP] Japan .................................. 2-170685

[51] Int. Cl.$^5$ ............................................. G06F 15/18
[52] U.S. Cl. ........................................ 395/23; 395/24
[58] Field of Search .............................. 395/23, 24, 25

[56] References Cited

U.S. PATENT DOCUMENTS

| | | | |
|---|---|---|---|
| 4,326,259 | 4/1982 | Cooper et al. | 364/715 |
| 4,933,872 | 6/1990 | Vandenberg et al. | 395/22 |
| 5,031,154 | 7/1991 | Watanabe | 395/22 |
| 5,033,006 | 7/1991 | Ishizuka et al. | 395/24 |
| 5,046,020 | 9/1991 | Filkin | 395/23 |
| 5,093,899 | 3/1992 | Hiraiwa | 395/23 |
| 5,107,454 | 4/1992 | Niki | 395/24 |
| 5,129,039 | 7/1992 | Hiraiwa | 395/24 |
| 5,131,072 | 7/1992 | Yoshizawa et al. | 395/24 |
| 5,140,530 | 8/1992 | Guha et al. | 395/24 |

OTHER PUBLICATIONS

Sebestyen, "Decision-Making Processes in Pattern Recognition," MacMillan, 1962, pp. 40–43, 47–53, 103, 108–112.

Le Cun et al., "Handwritten Digital Recognition: Applications of Neural Network Chips and Automated Learning", IEEE Communications Magazine, 1989.

Anton, "Elementary Linear Algebra," Wiley, 1981, pp. 182–187.

Wasserman, "Neural Networks, Part 2", IEEE Expert 1988.

Psaltis et al., "Optoelectronic Implementations of Neural Networks", IEEE Communications Magazine, Nov. 1989.

Lippman, et al., "Pattern Classification Using Neural Networks", IEEE Comm. Magazine, Nov. 1989.

A Neural Model for Category Learning, Douglas L. Reilly et al., Biological Cybernetics, Spring–Verlag 1982, pp. 35–41.

Learning System Composed of Multiple Neural Network Models, Nestor Inc., (Nestor Learning System) (no English translation available).

Primary Examiner—Allen R. MacDonald
Assistant Examiner—George Davis
Attorney, Agent, or Firm—Foley & Lardner

[57] ABSTRACT

A neural network includes an input layer composed of a plurality of cells receiving respective components of an input vector, an output layer composed of a plurality of cells representing attribute of the input vector, and an intermediate layer composed of a plurality of cells connected to all the cells of the input and output layers for producing a mapping to map a given input vector to its correct attribute. A learning method utilizing such neural network is carried out by image projecting the input vector into the partial dimensional space by a projection image operating means preliminarily prepared and by storing a coupling vector on the image projection space as well as the threshold and attribute vector.

3 Claims, 3 Drawing Sheets

NEURAL NETWORK PATTERN RECOGNITION LEARNING METHOD

BACKGROUND OF THE INVENTION

The present invention relates to a neural network learning method particularly suitable for an information processing technology for realizing a pattern identification apparatus.

It is considered that a pattern identification includes steps of expressing a pattern as a multidimensional characteristic value, i.e. pattern vector, and then classifying the vector given as an input signal. Pattern identification technology is applicable in various fields such as: diagnosing problems from given symptoms, discrimination of letters, classification and discrimination of signals, and analysis of images. In general, it is difficult to express in algorithm the classification processes because of the multiplicity of the input vectors (multidimensional characteristic values for expressing an input matter). The multidimensional nature of the inputs, referred to herein, means that there is a distribution range, which is not negligible, i.e. having no uniformity, even between input patterns belonging in identical classification caused by deformation and positional displacement in case of expressing a shape, and by noise and bias in case of signals.

It is generally thought that neural networks are available for and effective at solving such pattern classification problems as described above, for the following reasons. First, a neural network has the ability for self organization, by learning, of mapping (in concrete example, formation of cells and connections of respective cells) necessary for the classification of vectors: such as "such input vector should be classified in such manner". Second, the mapping thus formed has an ability of solving a non-linear separation problem encountered in various cases of pattern classification problems. Furthermore, the neural network has the ability of taking thereinto, as a prior knowledge, a characteristic quantity commonly possessed by the input pattern vectors which belong to the same class, as well as the distribution range of the characteristic quantity.

The neural network may be called a signal processing system simulating a nerve circuit network of a living organism. The neural network is basically composed of wiring connections performing signal transfer between the cells corresponding to neurons. The signal represents activity of a cell, in other words, the degree of excitation of a neuron, which is expressed with a numeric value. The numeric value is calculated as follows. A signal to be input into an aimed cell, the degree of activity of which is now required, is first obtained in accordance with the degree of activity of a cell connected to the aimed cell and a numerical value representing the binding or connection weight therebetween. Next, an output signal is obtained by a transfer function prescribing an output characteristic of the cell with respect to the first obtained input signal. The degree of activity of the aimed cell can thus be obtained.

Various models of neural networks have been proposed in accordance with signal propagating directions, learning algorithms and wiring connection methods between respective cells. Neural network research has been remarkably progressed by the provisions of a mathematical model called back propagation technology. In such mathematical model, the neural network is provided with a multilayer structure including input and output layers and a plurality of intermediate layers, and the respective cells are connected in a random manner. This structure is a stationary structure having no specific relation to the learning.

The binding intensity, i.e. connection weight, between the cells is only changed by the learning, and this is determined as follows. An input vector and a desired output vector, called a teacher signal are first prepared for the learning. Then, it is determined whether or not the neural network can realize, in the output layer, an activity pattern, i.e. output vector, according to the teacher signal with respect to the input vector.

In a case where the output vector is not in conformity with the teacher signal, an amount of error apart from a solution is transmitted to an output cell having an activity different from the teacher signal. With the cell having the activity larger than that shown in the teacher signal, the following two steps are carried out for degrading the activity, one being to lower the binding intensity between it and an intermediate cell transmitting a signal for activation and other being to lower the activity of this intermediate cell itself. In order to lower the activity of the intermediate layer, the error in the output layer is back propagated in a direction of the input cell to thereby subsequently amend the binding intensity to an afore-stage cell with respect to the input side. On the other hand, in case of the activity being lower than the teacher signal, the output error may be reduced by substantially the same steps as those described above. Such error correction method, in which the error correction is made from the output side towards the input side, is called the back propagation method.

The back propagation method or technique results in the so-called error minimizing problem which tries to adjust the coupling degree so as to minimize the square-error of the output signal and the teacher signal with respect to a pair of various input and teacher signals. Accordingly, when this back propagation technique is applied to the neural network having a complicated multilayer structure, a considerable amount of computing time is required for the learning to converge. Moreover, since the size of the neural network, and particularly, the size or scale of the intermediate layers, are made stationary with no relation to the content of the learning and since there is no theory for preliminary suitable determination, the determination should be done by trail and error repetitions. Furthermore, there is a limited ability for storing a pattern identification in the learning.

In order to obviate such defects of the back propagation technique as described above, there has been provided a neural model called "RCE Neural Network" (refer to D. L. Reilly, L. N. Cooper and C. Elbaum. "A Neural Model Category Learning", Biol. Cybern, vol. 45, pp. 35–41, 1982; or D. L. Reilly, L. N. Cooper and C. Elbaum. "Self Organizing Pattern Separator and Identifier," U.S. Pat. No. 4,326,259. Awarded Arp. 20, 1982). In this model, the neural network is provided with a three-layer structure including input, output and intermediate layers, in which adjacent layers are mutually coupled. The RCE neural network has a characteristic feature such that the intermediate layer cell is automatically produced by the learning, which is significantly different from the back propagation technique. Namely, each of the respective intermediate layer cells are activated only by a specific pattern of the input vector given to the cell, and the output layer cell is then activated for realizing, to the output layer, an output vector indicating a correct attribute of an input as a response. Such a point as that the intermediate layer can be self organized by the learning is a remarkable advantage for the RCE neural network.

In the RCE neural network, a signal propagation is performed in the following manner.

First, when an input vector $I_i$ (i=1, M) is given to an input layer composed of M cells (M: natural number), the input vector $I_i$ transferred to each of the intermediate layer cells. Each of the intermediate layer cells stores a M-dimensional vector $W_i$ called coupling vector, a threshold $\xi$, and an attribute vector $P_j$ (j−1, N) (N: number of output layer cells) representing an attribute value in a case where the vector $W_i$ is deemed to be an input vector, wherein each of the intermediate layer cells is activated in a case where a distance between the input vector I and the self coupling vector W is smaller than the threshold $\xi$. In accordance with this result, and activation signal is outputted so as to realize a pattern of the attribute vector $P_j$, (j=1, N) on the output layer. Namely each intermediate layer cell discriminates the fact as to whether or not the input vector I has the same attribute value as that of the coupling vector W within the allowable range of $\xi$ with a point indicated by the stored coupling vector W being the center thereof.

The above principle will be described hereunder with reference to FIG. 4, showing an example in which attributes of hatched areas 10 and 20 are classified into $\alpha$ and $\beta$, respectively. The areas 10 and 20 may be covered by the plurality of intermediate layer cells to correctly discriminate the classification by means of the neural network. In FIG. 4, area encircled by a plurality of circles represented respectively activation areas of the respective intermediate layer cells. The attribute of the input signal is discriminated to be $\alpha$ by the activation of one of five intermediate layers $\alpha 1$ to $\alpha 5$ and the attribute of the input signal is discriminated to be $\beta$ by the activation of one of the four intermediate layers $\beta 1$ to $\beta 4$.

The learning will be carried out by two methods, one being of the production of the intermediate layer cells and the other being of the change of the threshold. Basically, a pair consisting of a teacher signal and an input signal to be learned is indicated, and the learning is controlled by a deflection, i.e. error signal, between the output signal of the network and the teacher signal with respect to the input signal.

The production of the intermediate layer cell will occur in a case such as follows. When there is no response of the network to a certain input signal, an intermediate layer cell necessary for the discrimination of the attribute of the input vector of this input signal is absent and a new intermediate layer cell has to be produced in such a case. The input vector is stored in the newly produced intermediate layer cell as the coupling vector W, and the teacher signal is also stored therein as the attribute vector P. In accordance with the threshold $\xi$, an appropriate initial value is set.

In a case where the response to the input signal is erroneously made, the reason may reside in the activation of the intermediate layer cell which is not required to be activated, and accordingly, such error in the response will be eliminated by suppressing the activation of this erroneously activated intermediate layer cell. This will be carried out by making small the threshold $\xi$ of that intermediate layer cell. Namely, by making the small threshold, the activation area is reduced so that the input vector indicates an external portion of the area.

The characteristic features of the RCE neural network described hereinbefore will be summarized as follows.

(1) Since the intermediate layer can be self organized, there is no limit for an amount of memory.

(2) Since each of the memories is stored in each of the intermediate layer cells, the mutual interference between the respective memories is within the range of the threshold of the intermediate layer cell. Accordingly, only some of the intermediate layer cells are affected by the learning, so that any blocking against correct memory in accordance with the increase of an amount of learning is substantially reduced.

(3) Since a new mapping is stored by the production of the intermediate layer cell, the learning is finished in a short time period in comparison with the error back propagation technique.

As described above, the RCE neural network is effective for pattern classification, but provides the following problems.

The learning of the RCE neural network is, however, based on the fact that all of the examples are stored by the plurality of intermediate layer cells in a manner that a pair of an indicated input signal and the teacher signal is stored in one intermediate layer cell corresponding to one example. Accordingly, when the number of examples to be learned is increased, it is necessary to increase the number of the intermediate layer cells in proportion to the increased examples. Namely, the increasing of the dimensions of the input vectors necessarily results in the increasing of the learning examples of objects, and therefore, a numerous number of the intermediate layer cells has to be produced during the learning process in order to realize the neural network having an acceptable pattern identifying ability.

However, in the actual classification, there is a case in which the attribute of the input vector can be discriminated only by searching a partial dimensional space of a multidimensional input vector space. This case will be explained with reference to FIG. 1, for example, which represents the pattern classification in the three-dimensional space.

Referring to FIG. 1, it is supposed that the neural network is learned for the classification so that a point in an area $\alpha$ has its attribute of $\alpha$ and a point in a cylindrical area $\beta$ perpendicular to an X-Y plane has its attribute of $\beta$. The learning of the area $\alpha$ to the RCE neural network is achieved by covering the entire area $\alpha$ with several three-dimensional globes each having an appropriate radius. In this meaning, FIG. 1 shows an example of a mapping representing the attribute of the area $\alpha$ realized by eight globes, i.e. eight intermediate layer cells. In FIG. 1, the radius of the globe is equal to the threshold stored in the intermediate layer cell.

Regarding the area $\beta$, since this area extends indefinitely in the Z-axis direction, it is impossible to entirely cover the area with a finite number of intermediate layer cells. However, the attribute of the input vector can be discriminated by the presence or absence of the projection of the input vector on the X-Y plane, I', in an area $\gamma$ which is the projection of the area $\beta$ on the X-Y plane. Since the area $\gamma$ can be substantially entirely covered with finite number of circles, a projected image necessary for the discrimination of the definite area $\beta$ can be prepared by the finite number of intermediate layer cells by shifting the area to such partial dimensional space. With such problem, in the conventional technique, a separate network specific for the partial dimensional space had to be prepared for the discrimination of the attribute $\beta$.

Inclusive of such transfer image processing in the partial dimensional space, in the conventional RCE neural network technology, it was impossible to process the pattern classification with only one neural network.

SUMMARY OF THE INVENTION

An object of the present invention is to substantially eliminate defects or drawbacks encountered in the prior art and to provide a neural network leaning method in which an intermediate layer cell can be produced so as to totally handle or manage the pattern classification in the whole and partial dimensional spaces by utilizing a single neural network.

This and other objects can be achieved according to the present invention by providing a method of learning a neural network which includes input layer being composed of a plurality of cells receiving respective components of an input vector, an output layer being composed of a plurality of cells representing attribute of the input vector, and an intermediate layer being composed of a plurality of cells connected to all the cells of the input and output layers for producing a projection image making a given input vector coincident with a correct attribute, the learning method having the steps of:

preparing a projection image operating means for image projecting the input vector in a partial dimensional space in the intermediate layer cell;

image projecting the input vector into the partial dimensional space by the projection image operating means: and storing, in the intermediate layer cell, a threshold, an attribute vector and a coupling vector on the image projection space.

According to the present invention of the characters described above, a conventional RCE neural network learning technology is utilized with respect to the production of the intermediate layer and the change of the threshold. However, with respect to an example required for the learning, i.e. an example in which a procedure in the partial dimensional space is required to a conventional example signal pair of an input signal and a teacher signal, the image projection method for the input signal is also represented. The image projection method of the input vector is stored in the intermediate layer cell formed during the learning process, and simultaneously, the coupling vector on the image projection space, as well as the threshold and the attribute vector as in the conventional RCE neural network, is also stored.

DESCRIPTION OF THE PREFERRED EMBODIMENTS

The preferred embodiment of the present invention will be described below with reference to the accompanying drawings.

Figure 1:
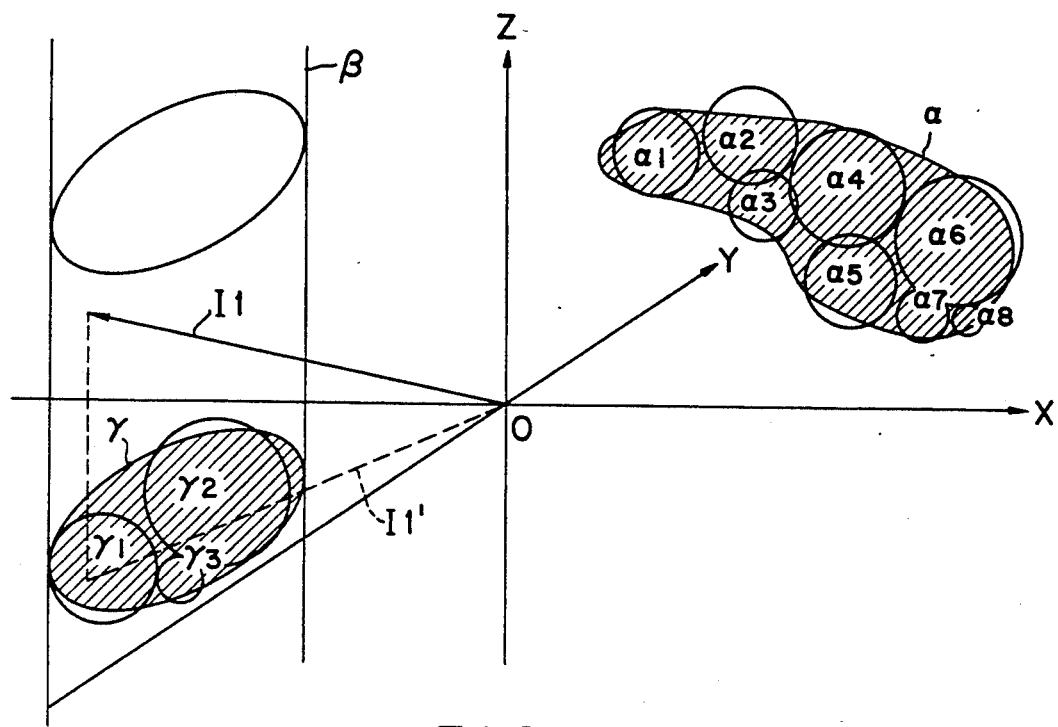
FIG. 1 is an illustration for explaining the basic theory of the present invention.

First, referring to FIG. 1, the basic theory of the present invention is described.

Referring to FIG. 1, an $\alpha$ area entirely covers an oblong area in a three-dimensional space. In this case, eight intermediate layer cells are formed corresponding to the eight globes shown, and this is the same manner as that in the conventional RCE neural network learning technology.

Regarding a cylindrical area $\beta$, the input/teacher signal pair relating to the area $\beta$ is illustrated, and simultaneously, an area $\gamma$ is covered by the indication of the learning from the input signal after the image projection on the X-Y plane. In this case, three intermediate layer cells corresponding to three circles are formed, and accordingly, a total of eleven intermediate layer cells are formed.

In the learning condition represented by FIG. 1, the attribute of the input vector $I_l$ will be discriminated as follows.

When the input vector $I_l$ is applied to the input layer of the neural network, the neural network searches for an intermediate layer cell to be activated by the input vector $I_l$. In the present example, since the input vector does not fall within any one of the areas $\alpha 1$ to $\alpha 8$, the cells corresponding to these areas maintain their inactive states. The three intermediate layer cells corresponding to the area $\gamma$ handles the input vector $I_l$ as a two-dimensional vector $I_l'$ image projected on the X-Y plane. Since, in FIG. 1, the two-dimensional vector $I_l'$ indicates a portion within the area $\gamma$, the intermediate layer cell prescribing the area $\gamma$ is activated and, as a result, the attribute of the input vector $I_l$ is correctly determined to be "$\beta$".

In the learning method of the present invention, the input/teacher signal pair and the image projection method of the input vector are simultaneously expressed to and stored in the RCE neural network. Therefore, according to the present invention, not only is the attribute of the input vector discriminated in the all dimensional space, but also the attribute can be discriminated by a subset of the global space, after the image projection to the partial dimensional space. Accordingly, the learning can be effectively performed and the reduction of amount of memory can be realized.

Figure 2:
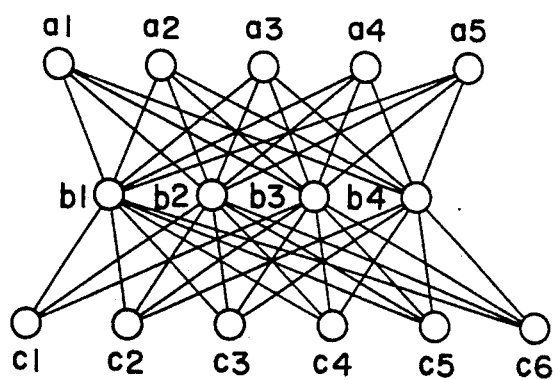
FIG. 2 shows a network representing one embodiment of the neural network structure according to the present invention.

FIG. 2 shows one embodiment representing a structure of the neural network according to the present invention, in which reference characters a1 to a5 denote input layer cells for taking in respective components of the input vector, and reference characters c1 to c6 denote output layer cells corresponding to the attribute of the input vector. Reference characters b1 to b4 denote intermediate layer cells self-organized during the learning process. The wiring connection among the respective cells is carried out in the following manner. The cells positioned in the same layer, i.e. input layer, intermediate layer and output layer, are not connected with each other. The connections are performed between the cells in the input and intermediate layers and between the cells in the intermediate and output layers, and all the cells are connected between these layers.

The number of the input layer cells is determined to be equal to the number of dimensions of the input vector. In this embodiment, the number is set to 5 for the sake of explanation. The number of the output layer cells is decided in accordance with the number of the attribute values necessary for the pattern classification, so that the number of the output layer cells is not essential for the explanation which will be given hereunder. The process in which the neural network represented by FIG. 2 is self organized by the learning system according to the present invention and the pattern classification function, after the learning, will be described hereinbelow.

The pattern classification function after the completion of the learning is first described. With reference to the neural network structure of FIG. 2, the signal transfer efficiency of each of the connections has a numerical value of "1" and the signal is transferred from the upper portion towards the lower portion, as shown. When the input signal I is input into the input layer, the input signal I is then transmitted into all the intermediate layer cells. In each of the intermediate layer cells, a specific area in a multidimensional space defining the input vector or a partial dimensional space thereof is stored, and in a case where the input vector points to a position in that area, the intermediate cell is activated. An amount of activation of a first intermediate layer cell is calculated by the following equation:

$$I' = G_1 \cdot I \qquad (1)$$

$$R_1 = f\left(\left[\sum_{i=1,M} (I_i' - W_{i,1})^2\right]^{\frac{1}{2}}, \xi_1\right) \qquad (2)$$

In the intermediate layer cell, there are stored, for image projecting the input signal to the partial space: an operator $G_l$, a coupling vector $W_l$, a threshold $\xi_l$, and an attribute vector $P_l$. When the input signal I is input into the intermediate layer cell, the image projection I' of the input signal I into the partial space is calculated in accordance with equation (1). The suffix "1" to the respective values means that the values are related to the first intermediate layer cell b1. Subsequently, the activation value $R_l$ of the intermediate layer cell 1 is calculated in accordance with equation (2), wherein supposing that the image projection I' is represented by an M-dimensional vector, the function f represents an M-dimensional globe area. In a case where the image projection I' is within this globe area, a value, i.e. signal, representing the fact that the intermediate layer cell 1 is activated is output when the image projection I' is not within this area, an inactivation signal is output. Typically, the activated state is denoted by "1" and the inactivated state is denoted by "0".

The function for defining the globe area is shown as follows.

$$f = \theta\left(\left[\sum_{i=1,M} (I_i' - W_{i,1})^2\right]^{\frac{1}{2}} - \xi_1\right) \qquad (3)$$

In this function, $\theta(x)$ is a step function which indicates "1" in case of positive value of x or "0" in case of negative value of x.

The activation value $R_l$ thus calculated is transmitted to the output layer as a vector signal by the attribute vector $P_l$ representing the coupling condition of the output layer and the intermediate layer cell. The attribute vector $P_l$ has a dimension corresponding to the cell number of the output layer and in case of a j(numeral)th component being expressed as $P_{j,l}$, the value $Q_{j,l}$ in the following equation is transmitted from the intermediate layer cell l to the output layer cell j.

$$Q_{j,l} = P_{j,l} \cdot R_l \qquad (4)$$

Inversely, viewing the output of the intermediate layer cell from the output layer cell j, signals represented by equation (4) are input into the output layer cell j from all of the intermediate layer cells. Accordingly, the activation $Q_j$ of the output layer cell j may be calculated by equation (5), rather than a simple mathematical average.

$$Q_j = \sum_{i=1,M} Q_{j,i} / \sum_{i=1,L} R_i \qquad (5)$$

In this equation, letter L represents the number of the intermediate layer cells, and Ri represents the certainty factor of intermediate layer cell i.

Accordingly, strictly speaking, the activation value $R_i$ and the activity $Q_{j,i}$ are transferred to the output layer cell j from the intermediate layer cell i, and the activity of the output layer cell is decided by both the values $R_i$ and $Q_{j,i}$.

The aforementioned concept will be summarized as follows.

The activation value $R_i$ (=0 or 1) of the intermediate layer cell bi is calculated from the input vector I in accordance with equations (1) and (2), and the vector $Q_i$ obtained by multiplying the attribute vector $P_i$ to the activation value $R_i$ is transferred to the output layer (since the attribute vector $P_i$ represents the teacher signal stored in the learning process, an optional value may be applied to each component value). In the output layer cell j, the activity $Q_j$ is calculated in accordance with equation (5) and thus the calculated value is regarded as an output of the neural network.

In a case where the output of the neural network is limited to a discrete value, that is, where the teacher signal does not take a value other than 0 or 1, the teacher signal is regarded as that stored during the learning process. In such a case, since the element or attribute vector $P_i$ does not take a value other than 0 of 1, the attribute vector $P_i$ can be combined with the connection state between the intermediate layer cell and the output layer cell. Namely, according to equation (5), the transfer efficiency between both the cells is either one of 0 of 1. Thus, in case of the transfer efficiency of 1, the connection is deemed to be present and in case of the transfer efficiency of 0, the connection is deemed to be absent. However, in a case where the attribute vector $P_i$ takes a real value other than 0 or 1, it is difficult to directly combine the attribute vector $P_l$ with the connection. In such a general case, it should be regarded that the whole intermediate layer cells and the output layer cells are all connected and the output value $P_{j,i} R_i$ of the intermediate cell is transferred to the output layer cell j from the intermediate layer cell i with the transfer efficiency of 1.

Figure 3:
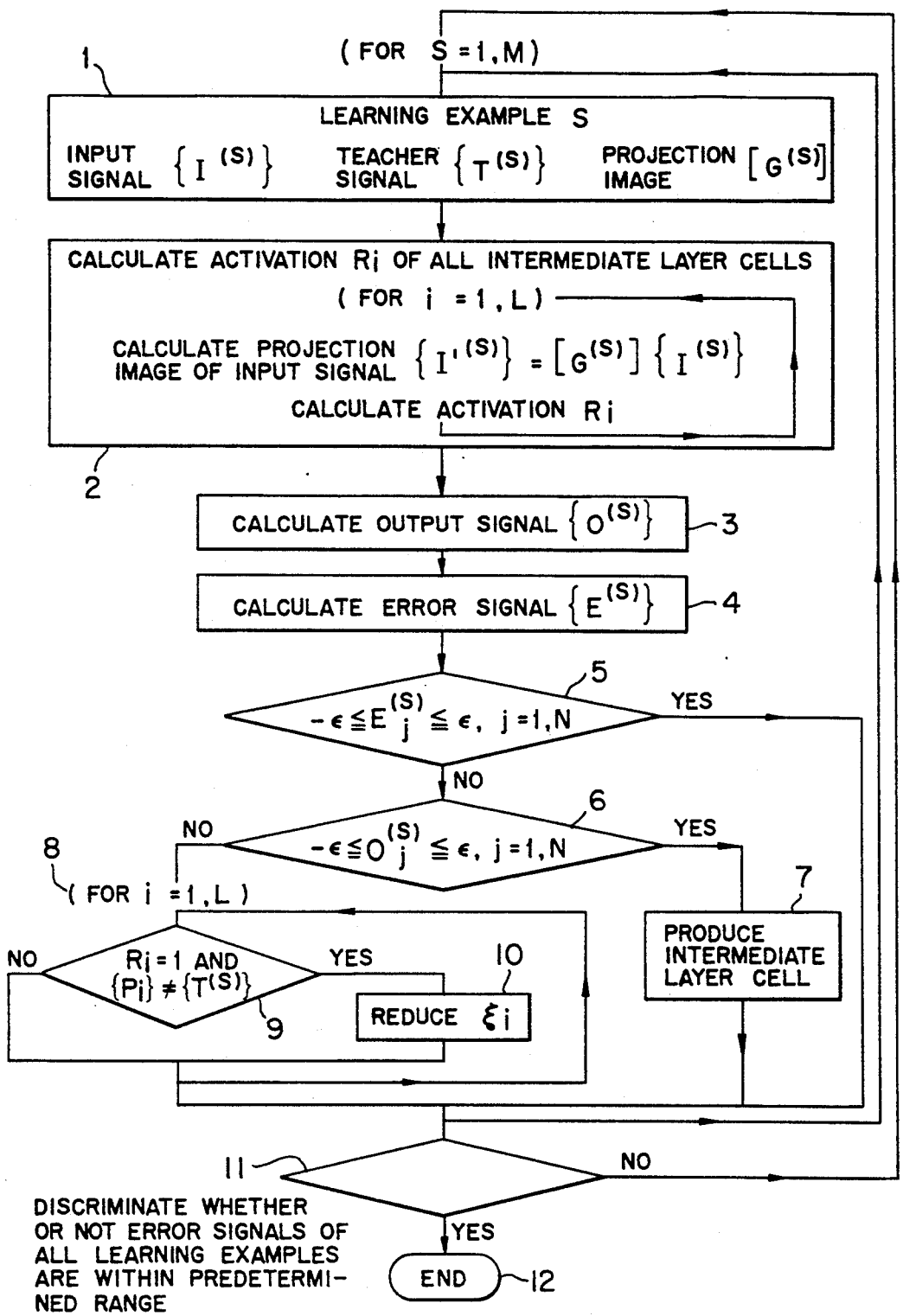
FIG. 3 is a flowchart representing learning procedures according to the present invention.
Figure 4:
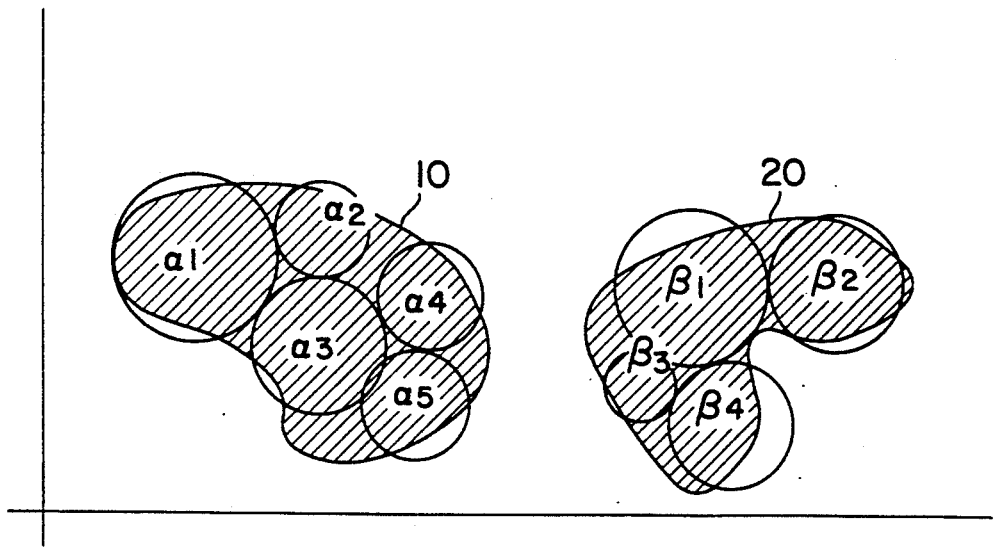
FIG. 4 is an illustration for explaining the area classifying method by means of the intermediate layer cell of the neural network.

The learning procedure of the neural network according to the present invention will be described below with reference to the flowchart shown in FIG. 3.

First, one of given learning examples ($\eta$, for example) is taken out. In Step 1 of FIG. 3, the learning example is constituted by an input signal $\{I^{(S)}\}$, a teacher signal $\{T^{(S)}\}$ and an operator $[G^{(S)}]$ representing the image projection method of the input signal, wherein suffix (S) means the S(numeral)th learning example, { } means a vector and [ ] means a matrix.

In the next Step 2, the activation values $R_i$ of the whole intermediate layer cells are calculated, in which the image projection $\{I'^{(S)}\}$ to a partial dimensional space is calculated and the activation values $R_i$ of the intermediate layer cells are then calculated in accordance with the equation (2).

After the calculation of the activation value $R_i$ of the intermediate layer cell bi, in Step 3, the activity of the output layer cell is calculated in accordance with the equations (4) and (5) and thus the calculated value is regarded as an output signal $\{O^{(S)}\}$ of the neural network.

In Step 4, an error signal $\{E^{(S)}\}$ being a trigger of the learning operation is calculated as a difference between the output signal $\{O^{(S)}\}$, when $\{I^{(S)}\}$ is input into the neural network, and the teacher signal $\{T^{(S)}\}$.

In Step 5, when whole components $E_j^{(S)}$ (j=1, N; number of cells in the output layer) of the error signal $\{E^{(S)}\}$ are within an allowable error range represented by a symbol $\epsilon$, it is possible, with respect to the learning example S, to reproduce the teacher signal $\{T^{(S)}\}$ by the intermediate layer cell already existing. In such case, the Step 5 advances to the next learning example.

On the other hand, in the Step 5, when the whole components of the error signal are not within the allowable error range, i.e. the result is NO, the step advances to Step 6. In Step 6, when the YES is output, i.e. the whole components of the output signal $O_j^{(S)}$ are within the allowable error range, it is determined that no intermediate layer cell is activated by the input vector $\{I^{(S)}\}$. In such a case, in Step 7, an intermediate layer cell for forming a mapping to the teacher signal $\{T^{(S)}\}$ from the input vector $\{I^{(S)}\}$ is produced.

On the contrary, when the result in Step 6 is NO, a threshold of an intermediate layer cell forming an error mapping is reduced so as not to activate the intermediate layer cell (Step 10). Namely, in this Step 10, the threshold $\xi_l$ is reduced so that the input vector, $\{I^{(S)}\}$ indicates an outside of the threshold region.

The intermediate layer cell forming the error mapping is determined by the following equation (Step 9 in FIG. 3):

$$R_i = 1 \qquad (6)$$

$$\{P_i\} \neq \{T^{(S)}\} \qquad (7)$$

Namely, the intermediate layer cell activated by the input vector $\{I^{(S)}\}$ must have an attribute vector $\{P\}$ equal to the teacher signal $\{T^{(S)}\}$. The equations (6) and (7) are equivalent to a case in which the above requirement is not satisfied. The discrimination in the Step 9 is carried out to the whole intermediate layer cells by repeating the Step 8 and the threshold $\xi_i$, is reduced when needed. As represented in Step 11, these learning operations are completed at a time when the error signals with respect to the whole learning examples have been ranged within the allowable range, and otherwise, the Step 1 is again executed.

In the Step 7 of production of the intermediate layer cell forming the projection image to the teacher signal $\{T^{(S)}\}$ from the input signal $\{I^{(S)}\}$, a new cell is provided in the intermediate layer cell of the neural network, and simultaneously, the cell of this intermediate layer is connected to all the cells of the input and output layers. Subsequently, the input signal $\{I^{(S)}\}$ required for the preparation of the projection image is regarded as a coupling vector $\{W\}$, the teacher signal $\{T^{(S)}\}$ is regarded as an attribute vector $\{P\}$ and the conversion, i.e. operator, $[O^{(S)}]$ expressing the image projecting method of the input signal is stored in the cell.

In the Step 10 in which the threshold $\xi_i$ is made small, the threshold $\xi_i$ is reduced so as to satisfy the following equation.

$$\{P_i - T^{(S)}\} > \xi_i \qquad (8)$$

As described above, according to the learning technology of the neural network of the present invention, the pattern classification or separation in the whole dimensional and partial dimensional spaces can be totally handled or managed by a single neural network.

It is, however, to be noted that the effective pattern classification in the partial dimensional space is limited to a specific case, and for example, in the three-dimensional space as shown in FIG. 1, the image projection will not be applied to a case having a conical area having a indefinite height. However, the image projection procedure of the input vector is effective to a symbol processing operation described below. Namely, supposing that respective signals $I_i$ (i=1, N) from a certain sensor output discrete values of 1,0 and −1, in a case where a projection image is required in which when a first component $I_l$ of the sensor signal is of a value −1, the condition of a plant is $\delta$ regardless of the value of the sensor, the sensor signal I is contracted to a single dimension of i=1 and only one intermediate layer cell for discriminating the value is prepared.

As described above, according to the present invention, it is possible to process or manage the pattern classification or separation techniques in the whole dimensional and partial dimensional spaces only using a single neural network without losing the characteristic features of the conventional RCE neural network.

What is claimed is:

1. A method of classifying a pattern in a neural network, the method comprising the steps of:

inputting an input signal into an input layer of said network, said input layer having input cells in a plurality at least as great as a number of dimensions of an input vector represented by said input signal;

transmitting said input signal to each cell in an intermediate layer, each said cell in said intermediate layer storing at least a partial dimensional space of said input vector;

activating in varying degrees those of said intermediate cells having a predetermined partial dimensional space corresponding in said varying degrees to said input vector, thereby projecting said input signal to said predetermined partial dimensional spaces and setting an activation value for each said intermediate cell; and transmitting to each output cell in an output layer of said network each activation value weighted by a predetermined attribute vector defining coupling between each said intermediate cell and each said output cell, wherein a said input vector, I, is projected onto a said predetermined partial dimensioned space by an operator $G_1$, such that an image projection $I' = G_1 \cdot I$ and said activation value $R_1$ for a first intermediate cell is:

$$f\left(\left(\sum_{i=1,M}(I_i' - W_{i,1})^2\right)^{\frac{1}{2}}, \xi_1\right)$$

and wherein $W_1$ is a coupling vector, and $\xi_1$ is a threshold.

2. A method of learning patterns in a neural network, the method comprising the steps of:

routing an input vector signal to input cells in an input layer and routing said input signal to each intermediate cell in an intermediate layer;

at each said intermediate cell applying a stored image projection operator for said intermediate cell to said input signal, thereby projecting said input signal to a partial dimensional space corresponding to said intermediate cell to arrive at an image projection of said input signal on each said intermediate cell;

from each said image projection, determining an activation value for each intermediate cell for said input signal;

activating each output cell in an output layer as an average of products of said activation value and an attribute vector defining coupling between each said intermediate cell and each said output cell to arrive at an output vector signal;

comparing said output vector signal to a teacher vector signal to obtain an error signal having components; and if a component of said error signal is not within an error tolerance, E, then i) producing a new intermediate layer cell if no intermediate layer cell is activated by said input signal; and ii) if a said intermediate layer cell forming said error is activated, reducing a threshold so as not to activate said intermediate layer cell forming said error with said input signal.

3. The method as recited in claim 2, wherein said new intermediate layer cell stores said input signal as said activation value, said teacher vector signal as said attribute vector, and said output vector signal as said image projection operator.

* * * * *